United States Patent [19]

Port et al.

[11] 4,019,252
[45] Apr. 26, 1977

[54] ELECTRIC SHAVER

[75] Inventors: Werner Port; Christian Schmieder, both of Schwalbach, Taunus, Germany

[73] Assignee: Braun Aktiengesellschaft, Frankfurt, Germany

[22] Filed: Feb. 21, 1975

[21] Appl. No.: 551,843

[30] Foreign Application Priority Data

Feb. 28, 1974 Germany .......................... 2409592

[52] U.S. Cl. ............... 30/43.92; 403/53; 403/57; 403/122
[51] Int. Cl.[2] ............ B26B 19/04; F16D 3/00
[58] Field of Search ............ 30/42, 43.7–43.92, 30/217, 219, 241, 272 A; 403/53, 57, 119, 122, 142

[56] References Cited

UNITED STATES PATENTS

| 2,364,162 | 12/1944 | Pasinski | 30/43.9 |
| 2,651,107 | 9/1953 | Bartlett | 30/219 |

Primary Examiner—Gary L. Smith
Attorney, Agent, or Firm—Michael J. Striker

[57] ABSTRACT

A shear head is mounted in a housing of the shaver and includes two cutters one of which is reciprocable relative to the other. An electric motor has a rotatable output shaft and motion-transmitting linkage connects the output shaft with the reciprocable cutter. The linkage includes a crank which is movable by the output shaft and a swing arm which is connected with the reciprocable cutter, and a joint which connects the crank and the swing arm with one another. The joint includes a spherical surface provided on the crank or the swing arm, and a pair of socket members provided on the swing arm or crank and contacting portions of the spherical surface along annular lines, there being sufficient play in the joint to permit relative tumbling movements of the element thereof about the center of the spherical surface.

11 Claims, 6 Drawing Figures

ELECTRIC SHAVER

BACKGROUND OF THE INVENTION

The present invention relates generally to an electric shaver, and more particularly to an electric shaver of the type having a shear head in which one cutter oscillates with reference to another cutter in response to rotation of the output shaft of the shaver motor.

Electric shavers of this type are known and use a linkage to transmit motion from the motor output shaft to the oscillating cutter. The linkage utilized a crank that is operated by the output shaft of the motor, and a swing arm which is connected with the crank and which effects the oscillatory movement of the oscillating cutter being mounted for swinging or pivoting movement about an axis. In the prior-art constructions, the axis of the motor output shaft, the axis about which the swing arm can pivot and the pivot axis of a joint connecting the crank with the swing arm all extend in parallelism with one another. This prevents tumbling movements of the connected components relative to one another. This arrangement basically operates satisfactorily, but of necessity it requires a considerable amount of space for installation, and is therefore frequently not useable because in many applications space is at a premium.

This is particularly true in the newer generations of electric shavers where the tendency is towards smaller and smaller housing, and in particular to housings which are required to be very flat. An attempt has been made to turn the motor axis through 90° with reference to the construction mentioned above, in order to thus obtain an arrangement which can be installed in a comparatively small housing. This resulted in the central plane of the motor being located in the plane of movement of the components of the linkage, and the joint which connects the swing arm and the crank that form a right angle with one another performs an oscillating movement in a portion of an arcuate path. The crank is required to follow this movement and additionally performs a movement about the longitudinal axis of the swing arm; since the latter is only pivotably mounted on a pivot, the swing arm cannot follow this movement. In order to make this arrangement work, it was necessary in the prior art to utilize a joint having several degrees of freedom, and a universal joint was utilized of the type having two pivots which extend at right angles to one another and are mounted in appropriate supports. This type of component is relatively complicated and the permissible tolerance variations in its manufacture are narrow. Moreover, it requires a relatively large number of operating steps to assemble it. As a result of this, such a universal joint is expensive. The use of expensive components, however, is detrimental in the manufacture of electric shavers which are mass-produced items and whose lose their sales appeal if they are too expensive.

Moreover, such a joint must, of course, be quite small in the context of an electric shaver, and this imposes great difficulties in maintaining the required narrow tolerances; on the other hand, unless the manufacturing tolerances are narrow, it is impossible to avoid undesired noise and vibrations in the use of a dry shaver incorporating such a joint. Again, the manufacturing tolerances must not be too narrow because this would make the joint too stiff and necessitate the use of a stronger electric motor to be able to overcome any resistance in the joint. The use of a stronger motor requires greater weight and larger dimensions for the shaver, and, of course, increases the manufacturing expense. Moreover, especially if the shaver is of the battery-operated type, the use of a larger motor is undesirable because a larger motor requires more electric current and will drain the batteries at an unacceptably high rate.

SUMMARY OF THE INVENTION

Accordingly, it is an object of this invention to overcome the disadvantages of the prior art.

More particularly, it is an object of this invention to provide an improved electric shaver or dry shaver which overcomes these disadvantages.

A further object of the invention is to provide such an electric dry shaver wherein a joint is provided which connects the swing arm and the crank of the motion-transmitting linkage in a manner permitting a low-friction unhindered relative movement between them with all necessary degrees of freedom and with maximum amount of play.

A further object of the invention is to provide such a dry shaver wherein this joint is extremely simple in its construction and assembly.

In keeping with these objects, and with others which will become apparent hereafter, one feature of the invention resides in an electric shaver which, briefly stated, comprises a housing, a shear head supported by the housing and including a first cutter and a cooperating second cutter, and an electric motor driving a rotatable output shaft. Motion-transmitting linkage means is provided connecting the output shaft with one of the cutters for imparting oscillatory movement to the same in response to rotation of the output shaft. The linkage means includes a crank member connected with and oscillatable by the output shaft, a swing arm member connected with one cutter, and a joint connecting the swing arm member with the crank member and including a joint member having a spherical surface and a pair of socket members each surrounding and in contact with a portion of the spherical surface. All of the members have sufficient spacing from one another except for the contact of the socket members with the spherical surface, so that the members are free to perform relative tumbling movements about the center of the spherical surface.

The spherical surface may be formed on a ball member, or it may be constituted by two part-spherical sections. What is important is that the socket members be able to perform oscillating sliding movements on the spherical surface whose amplitude is determined by the geometry of the crank linkage. The freedom of movement of crank member and swing arm member relative to one another about the center of the spherical surface is identified as "play" herein. It is of importance, however, that in radial direction of the spherical surface the parts of the motion-transmitting linkage have no play at all, or the minimum possible play, so that in the direction in which motion is transmitted, the linkage is free of play.

The invention provides for an extremely simple joint. The spherical surface can be constituted by two part-spherical portions which are formed on either the crank member or the swing arm member, for example by molding. This is particularly advantageous if the parts are molded—e.g., injection molded—of plastic synthetic material. In such a case, the entire joint is composed exclusively of two parts which are to be connected and which will have very low-friction contact, depending upon the type of synthetic plastic material being used, such as nylon. Particularly advantageous is the use of a hardened polished steel ball such as is used in ball bearings, to provide the spherical surface, since such steel balls are available with extremely narrow tolerances. Such a ball can be molded into the material of the crank member or the swing arm member, leaving only two diametrically oppositely located sections exposed which constitute the surface that is being contacted by the socket members. An even more advantageous construction is obtained if the spherical ball is snapped into an opening formed, for example at a free end of the swing arm member, so that at opposite sides of the swing arm member portions of the ball extend outwardly for engagement by the socket members. This latter construction completely eliminates any special handling, such as the insertion of the ball during injection molding or the like and results in an extremely simple construction. If a ball is used, the joint performs fully satisfactorily and is composed of more than three components which can be assembled in a simple manner. The highly polished surface of the metal ball assures small friction, so that the motor for the shaver can be small and relatively weak, which, in turn, facilitates an overall shaver construction which is small and light in weight. In the case of a battery-operated shaver, it has been found that, given a moderate amount of usage, the battery life can be increased from about 7 to about 10 days in this manner.

The spherical surface can be provided either on the swing arm member or on the crank member, as has already been indicated. The socket members will always be provided on the other member, that is if the spherical member is provided on the swing arm member the socket members will be provided on the crank member, and vice versa. A kinematic reversal is always possible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
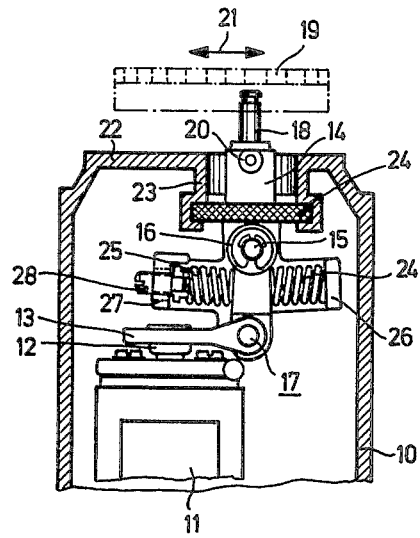
FIG. 1 is a section through the plane of symmetry of an electric shaver embodying the present invention, showing all those components which are necessary for an understanding of the invention.
Figure 2:
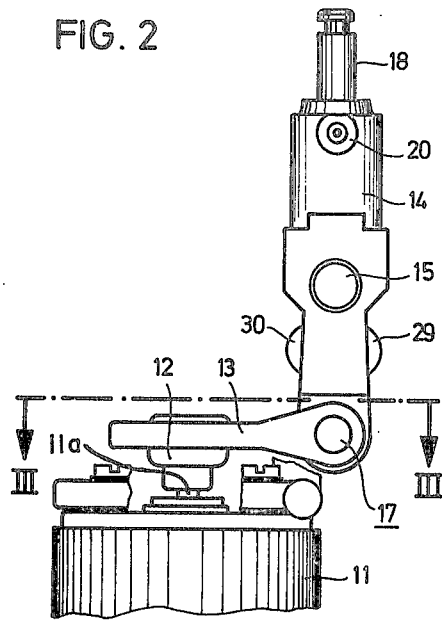
FIG. 2 is a fragmentary perspective on an enlarged scale showing a detail of FIG. 1.
Figure 3:
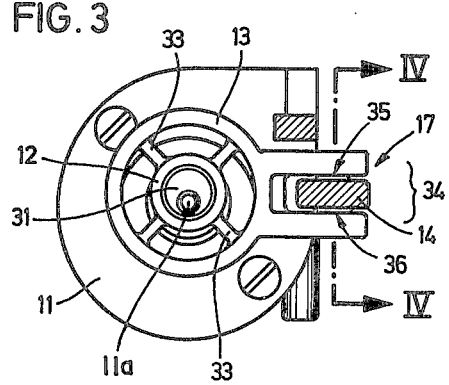
FIG. 3 is a section taken on line III—III of FIG. 2.

In FIGS. 1—3 only those portions of an electric dry shaver have been illustrated which are necessary for an understanding of the invention. The particular dry shaver that has been shown is a net-operated one, although the invention is, or course, applicable to battery-operated dry shavers also.

Reference numeral 10 identifies the housing which surrounds all drive components and in which a motor 11 is mounted whose output shaft 11a (FIG. 2) is rotatable and extends parallel to the plane of the drawing and to the side walls of the housing. At the upper end, the output shaft 11a supports an eccentric that is not visible in FIG. 1, and which extends into a bearing 12 of a crank or, more accurately, a connecting rod 13.

An elongated swing arm 14 is mounted laterally of the axis of the motor shaft 11a and in its rest position it extends substantially parallel to the same. The swing arm 14 can perform oscillating movements for which purpose it is mounted on a fixed pivot 15. It is retained by a retaining ring 16. With reference to the pivot 15, the swing arm 14 has two end portions, and at its lower end it is connected with the crank 13 via the joint 17 according to the invention. The crank 13 and the swing arm 14 together with the joint 17 form the motion-transmitting linkage from which motion is transmitted from the motor 11 to an oscillating cutter 19 of a shear head assembly which also comprises a stationary cutter (not shown) that will be located above the cutter 19 and fixedly mounted. Such assemblies are well known and it is not believed necessary to show the stationary cutter. The oscillating direction of the cutter 19 is identified by the double-headed arrow 21. The upper end of the swing arm 14 is connected with the cutter 19 via a coupling pin 18, in order to impart the oscillating movement to the cutter 19. The not illustrated upper cutter is similar to the lower cutter, but is stationarily mounted in the housing.

The shaver also includes a long hair trimmer which is also known from the art and driven by the swing arm 14. For this purpose, the swing arm is provided with a lateral pin 20 which extends normal to the plane of the drawing. The spacing between the pivot 15 and the joint 17 must evidently be greater than the crank radius of the eccentric on the shaft 11a. In accordance with the transmission ratio that has been selected, the cutter 19 will perform oscillating movements in the direction of the arrow 21 when the motor 11 is energized.

The housing 10 is provided with an upper wall 22 and an inwardly extending collar 23 which is dust-tightly connected via an elastic seal 24 with the swing arm 14, but in such a manner that it does not hinder the oscillating movements of the same. Restoring springs 24 and 25 engage the swing arm 14 and support the same with reference to fixed housing portions 26 and 27; a screw 28 is provided to permit resonance setting. The longitudinal axis of the output shaft 11a and of the motor 11 extends normal to the pivot axis of the pivot 15.

The components in FIG. 2 have the same reference numerals as in FIG. 1, and FIG. 2 is, therefore, self-explanatory.FIG. 2 additionally shows two rotationally symmetrical projections 29 and 30 which serve to fix the springs 24 and 25 of FIG. 1.

The mounting of the bearing 12 of the crank on the eccentric 31 of the motor shaft 11a is shown in FIG. 3, and it will be seen that the bearing 12 is connected with the crank 13 via a universal joint composed of thin elastic webs 33 between the bearing 12 and the annular portion of the crank 13.

At its side facing away from the motor shaft 11a, the crank 13 has a bifurcated end portion 34 which is configured to form two sockets 35 and 36. Located between these sockets is the lower end of the swing arm 14 which is slightly tapered in this region. The connection between the crank 13 and the swing arm 14 is effected by the joint 17, which will now be described in more detail with reference to FIGS. 4a—4c.

Figure 4A:
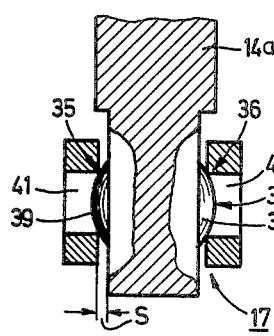
FIG. 4a is an enlarged-scale fragmentary section taken on line IV—IV of FIG. 3.
Figure 4B:
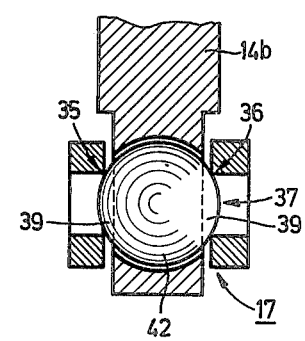
FIG. 4b is a section analogous to that in FIG. 4a, but illustrating a different embodiment.
Figure 4C:
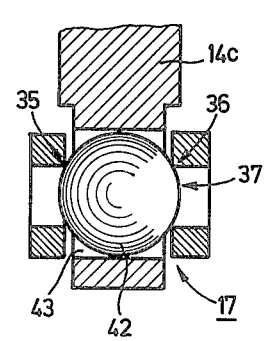
FIG. 4c is a section that is also analogous to that in FIG. 4a, but illustrates still a further embodiment of the invention.

FIGS. 4a–4c show three possibilites of making the joint 17. In all three embodiments, the joint has a spherical surface 37 and two sockets 35 and 36 which engage the spherical surface 37 at opposite sides. Of course, not the entire spherical surface 37 is necessary for the purposes of the joint, only those portions which extend at opposite lateral sides beyond the contour of the swing arm 14 and there form the spherical segments 38 or 39. The common axis of rotation of these segments 38 and 39 extend parallel to the axis of the pivot 15 for the swing arm 14. The sockets 35 and 36 are formed on the inner surfaces of the bifurcated end portion 34 of the crank 13 in all three embodiments of FIGS. 4a–4c and are located diametrically opposite one another with reference to the center of the spherical surface 37. The sockets 35 and 36 extend parallel to one another and are formed with cylindrical axially aligned bores 40 and 41, respectively, whose diameter is smaller than the diameter of the spherical surface 37 for such an amount that the edges bounding these bores engage the spherical surface 37 along annular lines. The necessary dimensions can be readily determined by means of simple tests; it is sufficient if the diameter of the bores 40, 41 corresponds to the radius of the spherical surface 37 or is slightly greater. If one imagines a conical portion of the sphere, surrounded by the spherical surface 37, being removed in direction inwardly from the annular contact line of the spherical surface with the respective sockets 35 or 36, and if one imagines the apex of the cone to coincide with the center of the spherical surface, then the opening angle of the cone should be approximately 60°–90°.

The bifurcated end portion 34 and/or the sockets 35 and 36 are made elastic by appropriate selection of the material and/or dimensioning, so that they can snap onto the spherical surface 37 in engagement therewith, to assume the positions shown in FIGS. 4a–4c. This assures an elastic engagement under slight tension. The desired elasticity can be obtained by using appropriate synthetic plastic materials such as polycarbonate, polyamide, or the like, for the bifurcated end portion 34 and/or the sockets 35, 36.

When the portions of the linkage are symmetrically arranged relative to one another, a play $s$ is obtained between the parts of the joint 17—with the exception of the contact along the annular lines on the spherical surface 37—which makes it possible for the various parts to perform a tumbling movement about the center of the spherical surface 37, in accordance with the geometry of the drive for the cutter 19. It will be clear from FIG. 3 that during a rotation of the shaft 11a, the crank 13 will perform a movement relative to the swing arm 14 (which cannot turn) that leads to an angling of swing arm 14 and the bifurcated end portion 34 of the crank 13. For this purpose, the center of the joint 17 moves on an arcuate portion, as shown in FIG. 2. The play $s$ takes these movements into account, as shown in FIG. 4a; the play should be approximately 0.2–0.5 mm. FIGS. 4a–4c show the center position of the crank 13 with the result that the play is of identical magnitude at both sides. In this position, the sockets 35, 36 are arranged symmetrically with reference to the symmetry plane passing through the center of the spherical surface 37 midway between the sockets.

In FIG. 4a, the spherical segments 38 and 39 constitute a unitary assembly with the swing arm 14a, that is they are of one piece with the same, advantageously produced from a synthetic plastic material by injection molding. In FIG. 4b, the spherical segments 38 and 39 are portions of a metal ball 42 which is injection molded into the material of the swing arm 14b, leaving the spherical segments 38, 39 free. As mentioned before, the metal ball 42 can be a bearing ball as used in ball bearings since these are commercially available and manufactured to high standards of tolerances.

In the embodiment of FIG. 4c, the metal ball 42 is pushed under slight pressure into an opening 43 of the arm 14c and the material of which the arm 14c is made (e.g., synthetic plastic material) can be readily selected to afford sufficient resilience so that it will properly grip and retain the ball 42 when the latter is pushed into the opening 43.

FIGS. 4a–4c clearly show that the joint 17 of the present invention is composed of merely two (FIG. 4a) or three (FIGS. 4b and 4c) parts which can be readily assembled with one another. A fully satisfactory operation is achieved without requiring narrow tolerances to be maintained, and the manufacture and assembly of the joint 17 is very simple and inexpensive. The annular line contact between the spherical surface 37 and the sockets 35, 36 assures a particularly low friction and, therefore, easy operation of the joint 17. The assembly of the joint can be carried out in a simple manner by snapping or pushing the various components together. The joint has a very extended lifetime and remains free of any play beyond the play $s$ over this lifetime, especially when the sockets 35, 36 engage the spherical surface 37 due to the inherent elasticity of their material or of the material of the end portion 34 of the crank 13, since in the event of wear the inherent resiliency provides an automatic compensation for this wear. Moreover, this resiliency assures for a compensation of even relatively large tolerance variations in the manufacture of the components.

It will be understood that each of the elements described above, or two or more together, may also find a useful application in other types of constructions differing from the type described above.

While the invention has been illustrated and described as embodied in an electric shaver, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

We claim:

1. An electric shaver comprising a housing, a shear head supported by said housing and including a first cutter and a cooperating second cutter; an electric motor having a rotatable output shaft; motion-transmitting linkage means connecting said output shaft with one of said cutters for imparting oscillatory movement to said one cutter in response to rotation of said output shaft, said linkage means including a crank member connected with and oscillatable by said output shaft, a swing arm member connected with said one cutter, and a joint connecting said swing arm member with said crank member and including a joint member having a spherical surface and a pair of socket members each surrounding and in contact with a portion of said spherical surface, said members all having sufficient spacing from one another except for the contact of said socket members with said spherical surface, so that said members are free to perform relative tumbling movements about the center of said spherical surface; journalling means for journalling said crank member on said shaft member; and a universal joint connecting said journalling means to said crank member.

2. An electric shaver comprising a housing, a shear head supported by said housing and including a first cutter and a cooperating second cutter; an electric motor having a rotatable output shaft; and motion-transmitting linkage means connecting said output shaft with one of said cutters for imparting oscillatory movement to said one cutter in response to rotation of said output shaft, said linkage means including a crank member connected with and oscillatable by said output shaft, a swing arm member connected with said one cutter and mounted for swinging about an axis extending substantially normal to said output shaft, said swing arm member having an end portion adjacent said crank member, and a joint connecting said swing arm member with said crank member and including a joint member comprising two semi-spherical sections together having a spherical surface and which together surround a joint axis of rotation that extends parallel to said axis of said swing arm, and a pair of socket members each surrounding and in contact with a portion of said spherical surface, said members all having sufficient spacing from one another except for the contact of said socket members with said spherical surface, so that said members are free to perform relative tumbling movements about the center of said spherical surface.

3. An electric shaver as defined in claim 2, wherein said crank member has an end portion which is bifurcated and has two inner sides which are directed towards one another, said socket members being mounted on said inner sides and being located diametrically opposite one another relative to said spherical surface.

4. An electric shaver as defined in claim 2, wherein said socket members are unitary with said swing arm member.

5. An electric shaver as defined in claim 3, wherein said joint member is a unitary spherical member of which said sections constitute respective parts, said spherical member being embedded in the material of said swing arm member except for said sections.

6. An electric shaver as defined in claim 5, wherein said spherical member is a metal ball.

7. An electric shaver as defined in claim 3, wherein said joint member is a unitary spherical member which is clampingly received in a recess of said swing arm member with said sections exposed.

8. An electric shaver as defined in claim 7, wherein said spherical member is a metal ball.

9. An electric shaver as defined in claim 2, said crank member having a bifurcated end portion including two legs which are each provided with one of said socket members, said socket member having respective axially aligned cylindrical bores of a diameter smaller than said spherical surface and bounded by edge portions of said socket members which engage said spherical surface along respective annular lines of contact.

10. An electric shaver as defined in claim 9, wherein said bifurcated end portion is resilient and said edge portions of said socket member engage said spherical surface with a biasing force resulting from the resilience of said bifurcated end portion.

11. An electric shaver as defined in claim 2; further comprising journalling means for journalling said crank member on said shaft member.

* * * * *